Patented Sept. 11, 1934

1,972,960

UNITED STATES PATENT OFFICE 1,972,960

PRODUCTION AND USE OF ANTHRACENE DYES

Robert Fraser Thomson, Ian Blohm Anderson, and Sidney Thornley, Grangemouth, Scotland, assignors to Imperial Chemical Industries Limited, a corporation of Great Britain No Drawing. Application August 19, 1931, Serial No. 558,186. In Great Britain August 25, 1930

14 Claims. (Cl. 260—61)

This invention relates to the production and use of benzanthrone derivatives; more particularly it relates to the manufacture of bodies having a benzanthrone nucleus and containing selenium, and to their use as intermediates in the production of further products and coloring matters, some of which do not contain selenium.

It is an object of this invention to provide a new series of intermediates of the benzanthrone series containing selenium. It is a further object of the invention to provide new processes for the production of further intermediates and coloring matters, using their selenium-containing intermediates as starting materials. It is a further object of the invention to provide a new process for the manufacture of dibenzanthrones and isodibenzanthrones. Other objects will appear hereinafter.

These objects are accomplished as set out in the following specification, and claims.

We have found that selenium and selenium compounds react readily with benzanthrone bodies to give what may be called "primary products" containing selenium. These primary products yield further valuable products, which are herein referred to as "secondary products", when submitted to various chemical treatments such as treatment with acid or alkaline condensing agents, nitration, halogenation, sulphonation, oxidation, reduction or condensation with organic halogen compounds. Both the primary and the secondary products can be used in some cases as intermediates and in some cases as coloring matters, e. g. vat dyes, or as both.

As starting materials for the primary products we use benzanthrones, including bromo-, chloro-, methyl-, nitro-, ethoxy- and similarly substituted benzanthrones and we treat these starting materials with the element selenium or with reactive compounds thereof such as selenium dioxide or selenious acid.

The treatment may be carried out in the presence or absence of solvents or diluents with or without addition of assisting substances such as acid absorbers or catalysts.

The resulting primary products are then treated for conversion into the secondary products by the methods already outlined and these secondary products may further be converted into other products in certain cases.

Primary products of the benzanthrone series may be obtained by treating benzanthrones or their derivatives with selenium or selenium compounds either alone or in the presence of organic or inorganic solvents or diluents with or without acid absorbers or catalysts. The resulting products appear to be analogous to certain known sulphur derivatives of benzanthrone such as benzanthrone sulphide, dibenzanthronyl sulphide, benzanthrone mercaptans, benzanthrone sulphones, etc. and it is possible that they consist of the corresponding selenium compounds. For example, treatment of Bzl-chlorobenzanthrone with selenium and caustic soda new body is obtained which appears to be Bzl-dibenzanthronyl hydrogen selenide of formula

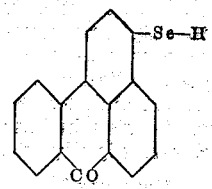

and on treatment of Bzl-chlorobenzanthrone with selenium powder and sodium acetate in tetra-hydronaphthalene a product which appears to be the corresponding Bzl:Bzl'-dibenzanthronyl selenide is obtained. On treatment of this latter body with hydrogen peroxide in concentrated sulphuric acid an oxidation product is obtained which may be a dibenzanthronyl selenone of the formula

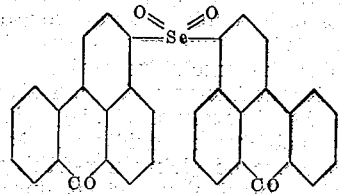

Corresponding bodies which contain chloromethyl, nitro, and other substituents can also be obtained.

In general the processes give excellent yields of products, in some cases equal to those theoretically possible. The products are also in many cases readily obtained in very pure form without a specific purification treatment. Further in many cases the amount of selenium required is only small and the results are surprisingly economical in spite of the fact that selenium and its compounds are relatively rather expensive substances for purposes such as the manufacture of dyestuffs. One particular advantage of the process is the fact that it enables isodibenzanthrones and chlorinated isodibenzanthrones to be readily obtained in excellent yields and of great purity. Halogenated isodibenzanthrones which give dyeings of particular purity can be obtained by our process.

Our invention will best be understood from the following illustrative examples, but it is not to be regarded as in any way limited to these specific examples. The parts are parts by weight.

Example 1

10 parts of benzanthrone are dissolved in 200 parts of 97 per cent sulphuric acid and 10 parts of finely divided selenium dioxide sprinkled in. The temperature is raised to 100° C. and kept at this for 24 hours. During heating the colour changes from bright red to pale olive brown. After cooling the product is boiled up with water and filtered. The brown residue remaining is boiled up again with the addition of a little alkali to the water, and again filtered, washed with water and dried. The dry product, on extracting with 6 parts of nitrobenzene and cooling is obtained in the form of reddish brown crystals. These dissolve in sulphuric acid to give a greenish-blue solution.

Example 2

5 parts of the product of Example 1 are added to a mixture of 50 parts of caustic potash and 30 parts of methylated spirits, heated to 140° C. and kept at this for 4 hours. The melt is then cooled, drowned in water, boiled, air-blown and filtered. The resulting dyestuff, which is apparently obtained in practically quantitative yield, dissolves in sulphuric acid with a green colour which becomes violet-blue on dilution with water. It dissolves in alkaline hydrosulphite giving a blue vat with a reddish-brown fluorescence from which cotton is dyed in blue shades which on oxidizing becomes slightly violet.

Example 3

2 parts of dyestuff obtained in Example 2 are dissolved in 20 parts of nitrobenzene with a little iodine and 2 parts of sulphuryl chloride added. The temperature is raised to 70° C. and kept at this until no more hydrochloric acid is evolved. The melt, which was at first green, becomes red-violet. Filtration is carried out at 70° C. and the product washed with nitrobenzene and alcohol. It forms a violet-red powder dissolving with a green colour in sulphuric acid, the green colour changing to violet-blue on dilution with water. With alkaline hydrosulphite it gives a greenish-blue vat without fluorescence from which cotton is dyed in slightly greenish shades of blue, which becomes violet-blue on oxidizing. It dissolves in hot nitrobenzene giving a reddish-violet solution with a brilliant-red-violet fluorescence.

Example 4

5.29 parts of Bzl-chlorobenzanthrone are added to 40 parts of tetrahydronaphthalene containing 1.2 parts of grey selenium powder and 3 parts of sodium acetate. The mixture is heated to the boil under reflux for several hours during which the colour changes from greenish-yellow to brown, and the melt filtered hot. The yield consists of about 4 parts of a yellowish-brown product which dissolves in sulphuric acid with a bright greenish-blue colour and which may be Bzl:Bzl'-dibenzanthronyl selenide.

Example 5

The product of Example 4 is fused with alcoholic potash using the method described in Example 2. A bright blue melt is obtained, which on dilution gives a violet blue suspension. The product obtained resembles isodibenzanthrone of excellent purity, and the yield is high.

Example 6

This is similar to Example 4 except that selenium dioxide is substituted for selenium. The product obtained is similar to that of Example 4 and on fusion gives a good yield of dyestuff which appears to be pure isodibenzanthrone.

Example 7

9 parts of Bzl-chlorobenzanthrone, 50 parts of methylated spirit, 3 parts of calcium hydroxide powder and 2 parts of selenium are mixed and heated in a closed vessel slowly to 180° C. and about 300 lbs. per square inch pressure. The temperature is maintained until conversion appears to be complete. The melt is then cooled and the product filtered off. On removal of excess selenium and calcium salts, what is apparently practically pure Bzl:Bzl'-dibenzanthronyl selenide melting above 310° is obtained.

In this process catalysts like copper may be used and acid absorbers like quick lime, barium hydroxide, sodium phosphate, sodium acetate, may be used instead of calcium hydroxide. Temperatures from 120° upwards are sufficient to effect conversion.

Example 8

If Example 7 is repeated using 3 parts of calcium hydroxide and 7 parts of sodium acetate a violet melt is obtained.

In boiling up this melt with 400 parts water and 30 parts of sodium selenide and filtering, a greenish yellow residue is left in the filter which on working up as before is found to be Bzl:Bzl'-dibenzanthronyl selenide. By carefully acidifying the violet-filtrates a brilliant orange yellow product is precipitated which contains 25 per cent selenium and appears to be benzanthrone-Bzl-hydrogen selenide. This body is not soluble in caustic soda solution but dissolves readily in sodium sulphide or sodium selenide solutions. It dissolves in concentrated sulphuric acid to give a blue violet solution, and on melting at temperatures of about 300° C. is converted into a product containing Bzl:Bzl'-dibenzanthronyl selenide.

Example 9

150 parts of bromine are added to 25 parts of dibenzanthronyl selenide at room temperature and the whole left to stand while stirring for 36 hours. The excess bromine is afterwards destroyed by the addition of sodium bisulphite solution, and the product after filtration is washed with water and dried. It is afterwards crystallized from 10 times its weight of nitrobenzene. The product corresponds to a tetrabrom-derivative. Bromine content=38.68 per cent, M. P.=253–256° C.

Example 10

Dry chlorine gas is passed into a stirred mixture of 10 parts of dibenzanthronyl selenide, 100 parts of nitrobenzene and a trace of iodine for 8 hours, the temperature being maintained at 18–20° C. The solid is separated by filtration and washed with nitrobenzene. The adhering nitrobenzene is removed by steam distillation and the product separated by filtration and dried. The crude product contains 7.44 percent chlorine.

Example 11

This is an example of the alkali fusion of the tetrabrom-derivative obtained in Example 9.

70 parts of caustic potash and 48 parts of methylated spirits are mixed and heated to 120° C. stirring being commenced as soon as possible. At 120° C. 20 parts of the tetrabrom body are added, the temperature raised to 130° C. and the whole kept at 130° C. for 6 hours. The mixture after cooling is extracted with 1000 parts of water and air blown through for 60 minutes to oxidize. 200 parts of sodium sulphite are added and the whole heated to boiling with stirring. After cooling the mixture is filtered, washed with cold water until free from alkali and dried. Analysis showed that the bromine has been practically all removed. The product dyes cotton from the vat in a shade similar to that given by isodibenzanthrone.

Example 12

This is an example of the oxidation of dibenzanthronyl selenide. 10 parts are dissolved by stirring in 150 parts of pure concentrated sulphuric acid at 17–20° C. While maintaining the temperature at 17–20° C. 15 parts of 30 per cent hydrogen peroxide are added in 75 minutes and afterwards the whole stirred at 17–20° C. for 65 minutes. The mixture is poured into 1500 parts of water, stirred, filtered, washed with cold water until free from acid and dried.

Example 13

This is an example of the alcoholic caustic potash fusion of the oxidation product of Example 12. 50 parts of caustic potash are dissolved by stirring at 95–98° C. in 74 parts of methylated spirits, 5 parts of the oxidation product are added and the whole stirred at 95–98° C. for 60 minutes. The mixture is poured into 500 parts of water and a stream of air blown through for 30 minutes to oxidize. 50 parts of sodium sulphide are now added and the whole heated with stirring to the boiling point. After cooling the product is filtered, washed with cold water until free from alkali and dried.

It dyes cotton a shade similar to that given by isodibenzanthrone.

Example 14

This is an example of the nitration of dibenzanthronyl selenide. 10 parts of the selenide and 75.2 parts of 96 per cent nitric acid are stirred at room temperature overnight. The product is poured into 1000 parts of water, filtered, washed with cold water until free from acid and dried. When crystallized from nitrobenzene a small quantity of material is obtained which possesses a nitrogen content similar to that required for a tetranitro-derivative.

Example 15

This is an example of the treatment of dibenzanthronyl selenide with 68 per cent nitric acid in the presence of concentrated sulphuric acid. 10 parts of the selenide are dissolved by stirring in 150 parts of pure concentrated sulphuric acid at 17–20° C. While maintaining the temperature at 17–20° C. 5 parts of 68 per cent nitric acid dissolved in 15 parts of pure concentrated sulphuric acid are added in 60 minutes. Afterwards the whole is stirred at 17–20° C. for 80 minutes. The mixture is poured into 1500 parts of water, stirred, filtered, washed with cold water until free from acid and dried. The crude product is crystallized from nitro-benzene.

Example 16

This is an example of the alcoholic caustic potash fusion of the product of Example 15. 50 parts of caustic potash are dissolved by stirring at 95–98° C. in 74 parts of methylated spirits. 5 parts of the product of Example 15 are added and the whole stirred at 95–98° C. for 60 minutes. The mixture is poured into 500 parts of water and a stream of air blown through for 30 minutes to oxidize. 50 parts of sodium sulphide are now added and the whole heated with stirring to the boiling point. After cooling the product is filtered, washed with cold water until free from alkali and dried.

It dyes cotton in grey shades from an alkaline hydrosulphite vat.

Example 17

This is an example of the production of a body which appears to be Bzl-benzanthronyl hydrogen selenide.

20 parts of Bzl-chlorobenzanthrone, 80 parts of caustic soda, 80 parts of selenium, 100 parts of water and 100 parts of methylated spirit are mixed together and refluxed for 24 hours. The resulting violet melt is then diluted with 1000 parts of water and filtered. The violet brown paste is washed with a little water, extracted with sodium sulphide solution to remove excess selenium and finally treated with dilute hydrochloric acid. The residue on drying is an orange yellow powder which is almost completely soluble in sodium sulphide solution giving a violet solution. It is insoluble in dilute caustic soda but dissolves in concentrated sulphuric acid with a blue violet colour. It melts at 290–300° C. when a chemical change appears to take place. It contains 25 per cent selenium and appears to be Bzl-benzanthronyl hydrogen selenide.

When dimethyl sulphate is stirred in the cold into the sodium sulphide solution of the product obtained in this example a product which is probably Bzl-benzanthronyl methyl selenide is obtained. This orange yellow product gives a pure green-blue solution in sulphuric acid.

Example 18

This is an example of the production of a body which from its method of formation is probably Bzl-benzanthronyl phenyl selenide.

When sodium Bzl-benzanthronyl selenide (prepared by dissolving the product of Example 17 in sodium sulphide solution, salting out the sodium salt by means of sodium chloride, filtering, washing with salt solution and drying), is refluxed for several hours in 5 to 10 parts of iodobenzene in the presence of 2 parts of soda ash and a trace of iodine, a product is obtained by filtering the cooled melt which is insoluble in sodium sulphide and gives a bright blue solution in sulphuric acid. This product consisting of an orange brown powder and which is probably benzanthrone-Bzl-phenylselenide, on treatment in concentrated alcoholic potash at 120°–160° gives a very good yield of isodibenzanthrone of excellent purity.

Example 19

This is another example for the production of the body which appears to be Bzl:Bzl'-dibenzanthronyl selenide.

1 part of benzanthrone-Bzl-hydrogen selenide is refluxed with 1 part of copper powder and 10 parts of nitrobenzene for several hours, on filtering the hot melt and cooling the filtrates what is apparently practically pure Bzl:Bzl'-dibenzanthronyl selenide crystallizes out in very good yields.

Example 20

This is a further example of the production of what appears to be Bzl:Bzl'-dibenzanthronyl selenide. Bzl-benzanthronyl hydrogen selenide is heated in a metal bath at 300° C. when the orange powder melts and remains molten. On cooling, grinding the pitchlike product, and extracting with sodium sulphide to remove the unchanged hydrogen selenide body a product is obtained which appears to contain some of the product described in Example 19.

Example 21

This is a further example of the production of the body which appears to be Bzl:Bzl'-dibenzanthronyl selenide.

1 part of Bzl-benzanthronyl hydrogen selenide is heated in a closed vessel with 10 parts of alcohol with a trace of copper and ½ part of lime when a practically quantitative yield is obtained of the product described in Example 19.

Example 22

This is a further example of the production of the body which appears to be Bzl:Bzl'-dibenzanthronyl selenide.

5 parts of Bzl-benzanthronyl hydrogen selenide are refluxed with 5 parts of selenious acid in 50 parts of nitrobenzene. On filtering the cooled melt a residue is obtained consisting of a mixture of a brown powder, free selenium and selenious acid. This powder gives a bluish red solution in sulphuric acid which on being reprecipitated by water is found to be a mixture of the original material and Bzl:Bzl'-dibenzanthronyl selenide. The filtrates on steam distillation or dilution with methylated spirits yield a brown product which is practically insoluble in sodium sulphide solution and gives a dull violet blue solution in sulphuric acid. This body on refluxing in nitrobenzene with copper powder is converted to Bzl:Bzl'-dibenzanthronyl selenide.

Example 23

This is a further example of the production of what appears to be Bzl:Bzl'-dibenzanthronyl selenide.

1 part of Bzl-benzanthronyl hydrogen selenide is dissolved in 10 parts of sulphuric acid and stirred for 5 hours when the violet colour changes to red with evolution of a little sulphur dioxide. On precipitation by dilution with water an orange yellow body is thrown out which in extraction with sodium sulphide solution is found to be mixture of the original starting material and some Bzl:Bzl'-dibenzanthronyl selenide.

If the above is repeated at 50° C. the same process takes place. If carried out at 100° C. the colour of the solution changes through red to green blue and a large amount of sulphur dioxide is evolved. On working up by dilution a dark brown paste is obtained on filtration yielding a black powder after extraction with sodium sulphide.

The body which gives a dull green solution in sulphuric acid gives on fusion in alcoholic potash a dyestuff resembling isodibenzanthrone in properties.

Example 24

50 parts of aluminium chloride are carefully dissolved in 200 parts of pure pyridine, 10 parts of Bzl:Bzl'-dibenzanthronyl selenide are then stirred in and the mixture is refluxed for 24 hours. The dark red melt is cooled and drowned in hydrochloric acid and the insoluble matter is filtered off and washed free of acid and aluminium salts.

The product which consists of a black violet powder contains what appears to be isodibenzanthrone. It dissolves in sulphuric acid to give a dull blue green solution from which red violet flocks are precipitated on dilution and dyes cotton red violet shades from a cornflower blue vat with red brown fluorescence.

On extraction with nitrobenzene practically pure isodibenzanthrone remains undissolved. The yield approaches the theoretical.

Example 25

If the pyridine is omitted from the previous example and the finely powdered mixture of dibenzanthronyl selenide and aluminium chloride is heated to 200° C. in 2 hours and held for 1 hour, the mass becomes partially molten. On cooling and extracting the mass with hydrochloric acid a product is obtained which is found to be partially soluble in toluene. The toluene soluble body is red and dissolves in sulphuric acid to give a red brown solution which on dilution changes to green and on infinite dilution red brown flocks are precipitated. The toluene insoluble portion dissolves in sulphuric acid to give a royal blue solution which on dilution gives red brown flocks.

Example 26

When 5 parts of dichlorobenzanthrone (prepared by chlorinating 10 parts of Bzl-chlorbenzanthrone to a dichloro-derivative by means of 10 parts of sulphuryl chloride in 100 parts of nitrobenzene in the presence of 0.1 part of iodine at 70° C. and filtering off the insoluble dichlorobody) are heated in a closed vessel with 50 parts methylated spirits, 2.5 parts calcium hydroxide, 1 part of selenium and a trace of copper powder, at 180° C. for several hours, a product is obtained on cooling and filtering off the insoluble matter, which when freed from excess selenium and calcium salts appears to be a chlorinated dibenzanthronyl selenide of melting point about 290° C. The product gives a green-blue solution in sulphuric acid and an alcoholic potash fusion at temperatures above 100° C. gives a dyestuff of the isodibenzanthrone type in good yield and of good purity.

Example 27

This is an example of the production of what appears to be a diamino-Bzl:Bzl'-dibenzanthronyl selenide.

If the previous example is repeated using nitro-Bzl-chlorobenzanthrone (prepared according to Example 1 of B. P. 256,281) instead of the dichlorobenzanthrone, a product is obtained in excellent yield which appears to be an amino derivative, probably diamino - Bzl:Bzl' - dibenzanthronyl selenide. The product which is a red brown powder dissolved in sulphuric acid to give a dark bluish green solution. On dilution yellow brown flocks are precipitated which on treatment with alkali change to red brown. The product melts at 292–295° C. and on alcoholic potash fusion gives a dyestuff of the isodibenzanthrone type in good yield.

Example 28

This is an example of the production of a body which also appears to belong to the Bzl:Bzl'-dibenzanthronyl selenide type.

If the previous example is repeated using methoxy-Bzl-chlorobenzanthrone (prepared according to Example 4 of B. P. 256,281) a product is obtained in excellent yield which gives a bright grass green solution in sulphuric acid, melts about 265–270° C., and on fusion with alcoholic potash gives a dyestuff of the isodibenzanthrone type in good yield and purity.

*Example 29*

5 parts of Bzl-chlorobenzanthrone, 50 parts of tetraline, 1.2 parts of selenium, 0.5 part of copper powder and 4 parts of sodium acetate are refluxed for several hours. On cooling, filtering off the insoluble matter and removing sodium salts etc., the body is obtained in practically pure form and in good yield. The same product is obtained if selenious acid is substituted for selenium.

*Example 30*

This is an example of the sulphonation of the product obtained in Example 7.

23.45 parts of the product obtained in Example 7 are added to 258.5 parts of 6.5 per cent oleum during 30 minutes, the temperature being maintained at 22–25° C. The whole is now stirred at 22–25° C. until complete sulphonation has occurred as indicated by the complete solubility of a test portion in hot water. Afterwards the mixture is poured into 2500 parts of stirred cold water, 300 parts of salt added and the whole stirred overnight. It is filtered, the residue washed with 20 per cent salt solution until free from acid and dried.

*Example 31*

This is an example of the treatment of the product of Example 7 with 96 per cent nitric acid using nitrobenzene as solvent.

10 parts of the product of Example 7 are added to 100 parts of nitrobenzene and the whole stirred for 10 minutes. 30 parts of 96 per cent nitric acid are added, the temperature being allowed to rise to 35° C. The temperature is afterwards raised to 50° C. for 1 hour 20 minutes. Subsequently it is allowed to cool to room temperature and stirred at room temperature overnight. The whole is poured into 480 parts of methylated spirits, stirred, the precipitated solid separated by filtration, washed with methylated spirits until free from nitrobenzene and afterwards washed with water. After drying the solid is crystallized from 10 times its weight of nitrobenzene. About 30 per cent of the solid crystallizes out possessing a nitrogen content of 4.01 per cent.

We claim:

1. In the manufacture of benzanthronyl selenides, the process which comprises heating a benzanthrone with a reactive selenium material of the class consisting of selenium and selenium dioxide.

2. In the manufacture of dyestuffs of the isodibenzanthrone type, the process which comprises heating Bzl:Bzl'-dibenzanthronyl selenide with a condensing agent until reaction is effected and a dyestuff is formed, the said condensing agent being a metal halide condensing agent of the class comprising aluminum chloride.

3. Unsymmetrical benzanthronyl selenides, having the general formula $$R_1-Se-R_2$$

wherein $R_1$ represents a benzanthronyl radical and $R_2$ represents hydrogen or a metallic atom, or an alkyl or aryl radical, said benzanthronyl selenides being suitable for the preparation of intermediates and dyes.

4. Bzl-benzanthronyl hydrogen selenide.

5. Bzl:Bzl'-dibenzanthronyl selenone.

6. The process of preparing a selenium derivative of benzanthrone, which comprises reacting benzanthrone with selenium dioxide in a medium of sulfuric acid.

7. The process of preparing a compound of the dibenzanthronyl-selenide series which comprises reacting a Bzl-halogen-benzanthrone with selenium dioxide in an organic solvent in the presence of an acid absorbing agent.

8. In the process of preparing a compound of the dibenzanthronyl selenide series, the step which comprises reacting a Bzl-halogen-benzanthrone with selenium to produce a benzanthrone-hydrogen-selenide.

9. The process of preparing a benzanthrone-hydrogen-selenide, which comprises reacting a Bzl-halogen-benzanthrone with selenium under conditions milder than those leading to a dibenzanthronyl selenide.

10. The process of preparing dibenzanthronyl-selenone, which comprises subjecting dibenzanthronyl-selenide to the action of a mild oxidizing agent.

11. The process of preparing a compound containing a benzanthrone nucleus and also containing selenium, which comprises reacting a Bzl-halogen benzanthrone with selenium to produce a mono-benzanthrone-selenol, and reacting the latter with an etherifying agent to replace the hydrogen atom of the selenol radical by an organic radical of the alkyl or aryl series.

12. In the manufacture of dyestuffs of the isodibenzanthrone type, the process which comprises heating a Bzl, Bzl'-dibenzanthronyl-selenide with aluminum chloride.

13. Substitution derivatives of Bzl, Bzl'-dibenzanthronyl-selenides as may be prepared by subjecting Bzl, Bzl'-dibenzanthronyl selenide to an operation selected from the group consisting of oxidation, nitration, and sulfonation.

14. In the manufacture of a compound containing at least one benzanthrone nucleus and also containing selenium, the step which comprises heating a Bzl-halogen-benzanthrone with selenium in alcoholic medium, in the presence of an acid absorbing agent.

ROBERT FRASER THOMSON.
IAN BLOHM ANDERSON.
SIDNEY THORNLEY.